(12) United States Patent
Kootstra et al.

(10) Patent No.: US 7,704,024 B2
(45) Date of Patent: Apr. 27, 2010

(54) METHODS AND SYSTEMS FOR TRANSPORTING WIND TURBINE COMPONENTS

(75) Inventors: Dirk-Jan Kootstra, Beekbergen (NL);
Eric Arthur Baker, Scotia, NY (US);
John P. Davis, Schenectady, NY (US)

(73) Assignee: General Electric Company, Schenectady, NY (US)

(*) Notice: Subject to any disclaimer, the term of this patent is extended or adjusted under 35 U.S.C. 154(b) by 313 days.

(21) Appl. No.: 11/671,833

(22) Filed: Feb. 6, 2007

(65) Prior Publication Data

US 2007/0189895 A1  Aug. 16, 2007

Related U.S. Application Data

(63) Continuation-in-part of application No. 11/343,885, filed on Jan. 31, 2006.

(51) Int. Cl.
*B60P 3/40* (2006.01)
*B61D 3/00* (2006.01)

(52) U.S. Cl. ..................... 410/44; 105/355

(58) Field of Classification Search ........... 105/199.1, 105/238.1, 355, 393, 396, 407; 410/44–47, 410/77, 101
See application file for complete search history.

(56) References Cited

U.S. PATENT DOCUMENTS

| | | | |
|---|---|---|---|
| 5,145,073 A | 9/1992 | Kitagawa et al. | |
| 5,628,403 A | 5/1997 | Thomas et al. | |
| 5,997,228 A * | 12/1999 | Potter | 410/155 |
| 6,286,435 B1 * | 9/2001 | Kassab et al. | 105/171 |
| 6,983,844 B2 | 1/2006 | O'Kane et al. | |
| 7,204,665 B2 | 4/2007 | Heuvel et al. | |

(Continued)

FOREIGN PATENT DOCUMENTS

DE   3416375 A1   11/1985

(Continued)

OTHER PUBLICATIONS

European Search Report for EP07100810; Mar. 10, 2008; 8 pages.

(Continued)

*Primary Examiner*—S. Joseph Morano
*Assistant Examiner*—Robert J McCarry, Jr.
(74) *Attorney, Agent, or Firm*—James McGinness, Esq.; Armstrong Teasdale LLP

(57) ABSTRACT

A mounting system includes a plurality of adjacent railcars including a first railcar that includes spaced first and second wheel assemblies each including at least one wheel pair. The mounting system also includes a first and second frames coupled to the first railcar. The first frame includes a space defined between at least two portions of the first frame and at least one cushion selectively positionable within the first frame space. The second frame includes a space defined between at least two portions of the second frame and at least one cushion selectively positionable within said second frame space. The first and second frames are spaced to facilitate at least one of partially containing and partially supporting the load. The first frame is substantially centered over at least one first wheel assembly wheel pair, and the second frame is substantially centered over at least one second wheel assembly wheel pair.

20 Claims, 10 Drawing Sheets

U.S. PATENT DOCUMENTS

| | | |
|---|---|---|
| 7,210,882 B2 * | 5/2007 | Andersen et al. .............. 410/82 |
| 7,326,013 B2 | 2/2008 | Heuvel et al. |
| 2003/0175089 A1 | 9/2003 | Almind et al. |
| 2004/0217037 A1 | 11/2004 | O'Kane et al. |
| 2004/0262926 A1 | 12/2004 | Hansen |
| 2005/0002749 A1 | 1/2005 | Anderson et al. |
| 2005/0016165 A1 | 1/2005 | Enis et al. |
| 2005/0019166 A1 | 1/2005 | Bervang |
| 2005/0031431 A1 | 2/2005 | Wobben |
| 2005/0123382 A1 | 6/2005 | Christensen et al. |
| 2005/0180833 A1 | 8/2005 | Almind |
| 2005/0220558 A1 | 10/2005 | Heuvel et al. |
| 2006/0113449 A1 | 6/2006 | Nies |
| 2006/0251517 A1 | 11/2006 | Grabau |

FOREIGN PATENT DOCUMENTS

| | | |
|---|---|---|
| JP | 2002059776 A1 | 2/2002 |
| WO | 03057528 A1 | 7/2003 |
| WO | 03076370 A1 | 9/2003 |
| WO | 2005005286 A1 | 1/2005 |
| WO | 2005005822 A1 | 1/2005 |
| WO | 2005007515 A2 | 1/2005 |
| WO | 2005071261 A1 | 8/2005 |
| WO | 2006000230 A1 | 1/2006 |

OTHER PUBLICATIONS

Office Action; U.S. Appl. No. 11/343,885; Feb. 2, 2009; 14 pages.

Chinese Patent Office, Translated First Office Action and Text of First Office Action for Patent Application No. 200710006158.X, Nov. 20, 2009, 8 pages.

* cited by examiner

METHODS AND SYSTEMS FOR TRANSPORTING WIND TURBINE COMPONENTS

CROSS REFERENCE TO RELATED APPLICATIONS

This application is a Continuation-In-Part of currently pending U.S. patent application Ser. No. 11/343,885 filed Jan. 31, 2006, which is hereby incorporated by reference in its entirety.

BACKGROUND OF THE INVENTION

This invention relates generally to transportation methods and systems, and more specifically to methods and systems for transporting wind turbine components by rail.

At least some known wind turbines are disassembled into four types of components such as, but not limited to, rotor blades ("blades"), tower, rotor hubs, and nacelles for transportation. Generally, such wind turbine components are stored in cargo containers and affixed to transport structures such as, but not limited to, railroad cars and/or trucks for transportation to a storage site and/or an assembly site. Such cargo containers facilitate shipping wind turbine components by ship, railroad, and/or truck so that the components may be changed from one transportation mode to another without unloading and/or loading the components from the containers.

At least some known wind turbine components are relatively large as compared to other wind turbine components. Some known wind turbine components such as the towers may be individually disassembled into smaller pieces for transportation. Other wind turbine components such as the blades are substantially unitary precision instruments that remain intact during transportation. As such, the blades may be relatively large (e.g., some exceeding 160 feet in length and 12 feet in width) as compared to other wind turbine components.

Such blades are generally stored within known container structures that contain at least one wind turbine rotor blade entirely within. At least some known container structures that entirely contain two or more blades therein typically orient a root of one blade adjacent a tip of another blade. Because such known containers entirely contain larger loads, such as the blades, known transportation methods and systems facilitate increasing an overall size and/or weight of an overall load supported on the respective railcar. As a result, such known transportation methods and systems also facilitate increasing associated rail transportation costs of larger wind turbines as compared to truck transportation.

BRIEF DESCRIPTION OF THE INVENTION

In one aspect, a mounting system for at least one of supporting and transporting a unitary load is provided. The mounting system includes a plurality of adjacent railcars including a first railcar having spaced first and second wheel assemblies each including at least one wheel pair. The mounting system also includes a first frame coupled to the first railcar. The first frame has a space defined between at least two portions of the first frame and at least one cushion selectively positionable within the first frame space. The mounting system also includes a separate second frame coupled to the first railcar. The second frame has a space defined between at least two portions of the second frame and at least one cushion selectively positionable within the second frame space. The second frame is spaced from the first frame to facilitate at least one of partially containing and partially supporting the load. The first frame is substantially centered over the at least one wheel pair of the first wheel assembly, and the second frame is substantially centered over the at least one wheel pair of the second wheel assembly.

In another aspect, a method for at least one of supporting and transporting at least one unitary load is provided. The method includes providing a plurality of adjacent railcars including providing a first railcar that includes spaced first and second wheel assemblies each including at least one wheel pair. The method also includes coupling a first frame to the first railcar. The first frame having a space defined between at least two portions of the first frame and at least one cushion selectively positionable within the first frame space. The method also includes receiving another portion of the at least one unitary load within the first frame space and coupling a separate second frame to the first railcar. The second frame having a space defined between at least two portions of the second frame and at least one cushion selectively positionable within the second frame space. The method also includes receiving a portion of the at least one unitary load within the second frame space, coupling a first frame to the first railcar including substantially centering the first frame over the at least one wheel pair of the first wheel assembly, and coupling a second frame to the first railcar including spacing the second frame away from the first frame to facilitate at least one of partially containing and partially supporting the at least one unitary load. The method also includes substantially centering the second frame over the at least one wheel pair of the second wheel assembly.

In a further aspect, a method for at least one of supporting and transporting at least one rotor blade is provided. The method includes providing a plurality of adjacent railcars including providing a first railcar that includes spaced first and second wheel assemblies each including at least one wheel pair. The method also includes coupling a first frame to the first railcar. The first frame having a space defined between at least two portions of the first frame and at least one cushion selectively positionable within the first frame space. The method further includes receiving a portion of the at least one rotor blade within the first frame space and coupling a separate second frame to the first railcar. The second frame having a space defined between at least two portions of the second frame and at least one cushion selectively positionable within the second frame space. The method also includes receiving a portion of the at least one rotor blade within the second frame space, coupling a first frame to the first railcar including substantially centering the first frame over the at least one wheel pair of the first wheel assembly, and coupling a second frame to the first railcar including spacing the second frame away from the first frame to facilitate at least one of partially containing and partially supporting the at least one rotor blade. The method also includes substantially centering the second frame over the at least one wheel pair of the second wheel assembly.

DETAILED DESCRIPTION OF THE INVENTION

The exemplary methods and apparatus described herein overcome the disadvantages of at least some known wind turbine rotor blade rail transportation methods and systems by providing methods and systems including spaced fixture assemblies that are coupled to a railcar to support a load thereon.

Figure 1:
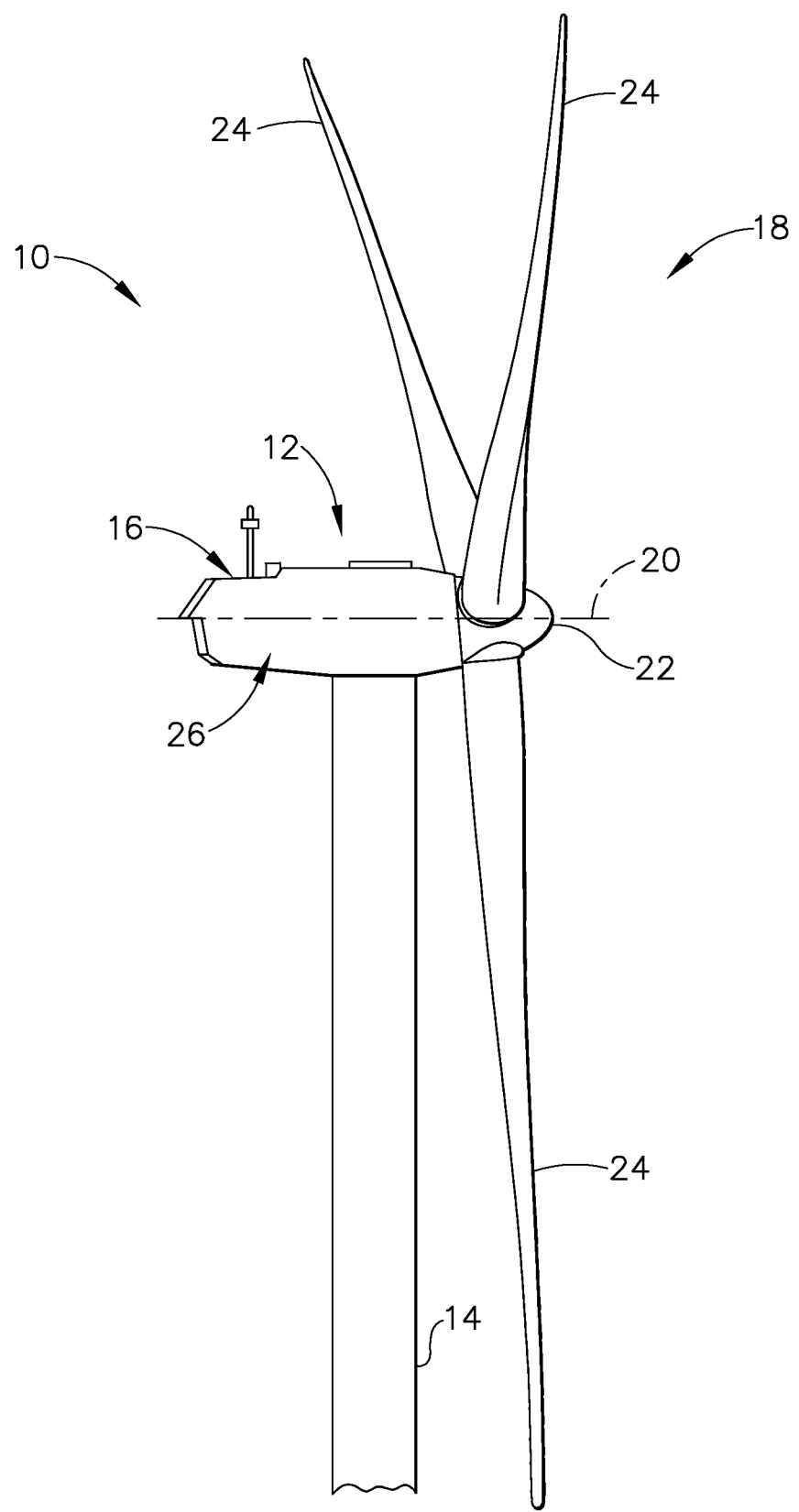
FIG. 1 is a schematic illustration of an exemplary wind turbine generator including wind turbine rotor blades.

FIG. 1 is a schematic illustration of an exemplary wind turbine 10. In the exemplary embodiment, wind turbine 10 is a horizontal axis wind turbine. Alternatively, wind turbine 10 may be a vertical axis wind turbine. Wind turbine 10 includes a tower 14, a nacelle 16 coupled to tower 14, and a rotor 18 coupled to nacelle 16 for rotation about an axis of rotation 20. Rotor 18 includes a rotatable hub 22 and a plurality of rotor blades ("blades") 24 coupled to hub 22. In the exemplary embodiment, rotor 18 includes three blades 24. In an alternative embodiment, rotor 18 may include more or less than three blades 24. General operation, dimensions, and configuration of wind turbine 10, and more specifically wind generator 12, is known in the art and therefore will not be described in more detail herein.

In the exemplary embodiment, blades 24 have a length between approximately 30 meters (m) (98 feet (ft)) and 100 meters (m) (328 ft) and all subranges therebetween or, more specifically, between approximately 50 meters (m) (164 feet (ft)) and 56 meters (m) (183 feet (ft)). Alternatively, blades 24 may have any length that facilitates overhanging blades 24 from at least one longitudinal endmost portion of a railcar, as later described in detail. Blades 24 are coupled to rotor hub 22 to facilitate rotating rotor 18 about axis of rotation 20 to transfer kinetic energy from the wind into usable mechanical energy, and subsequently, electrical energy.

Figure 2:
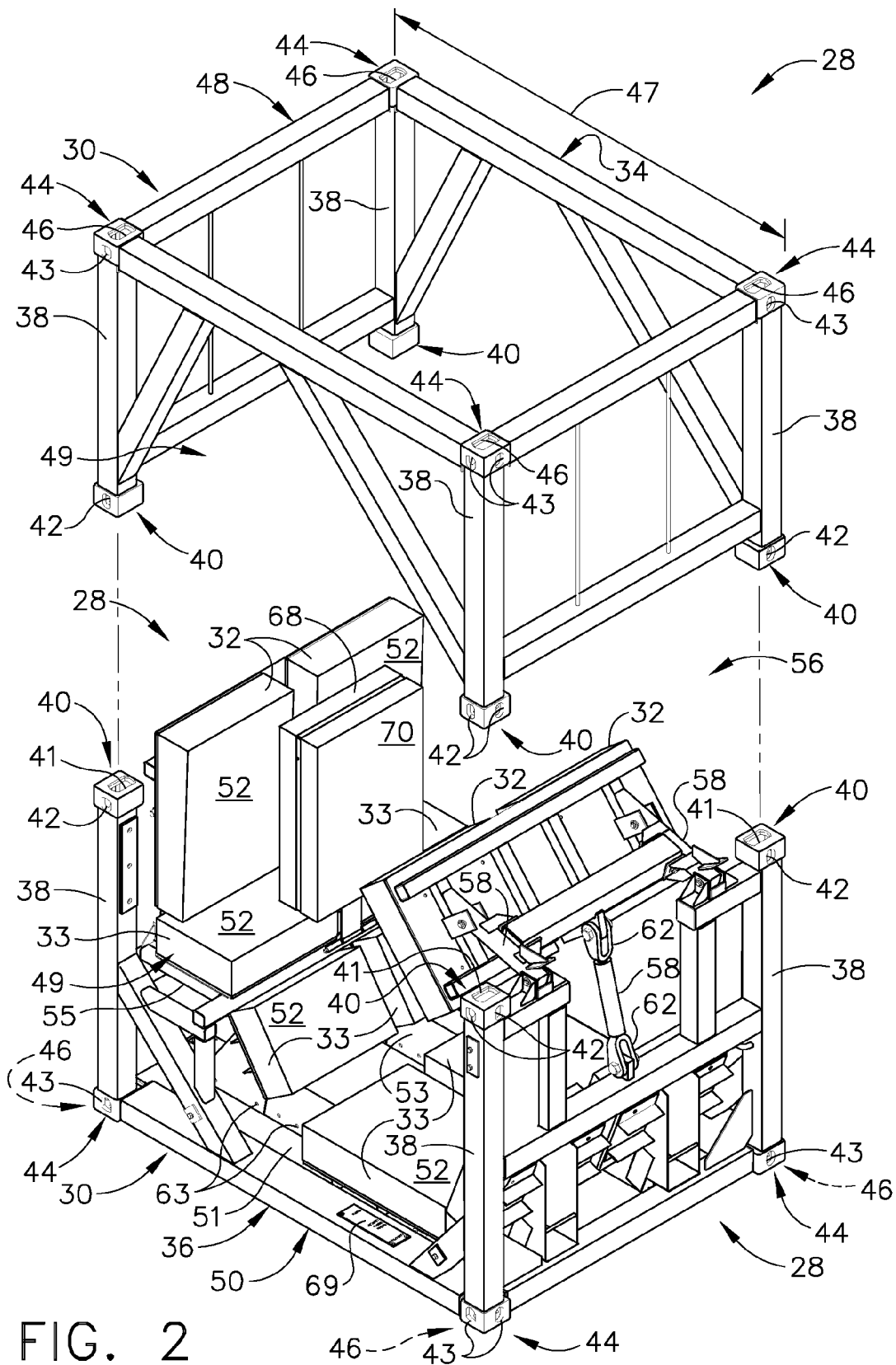
FIG. 2 is a partially exploded perspective view of an exemplary embodiment of a fixture for supporting and/or transporting a wind turbine rotor blade.
Figure 3:
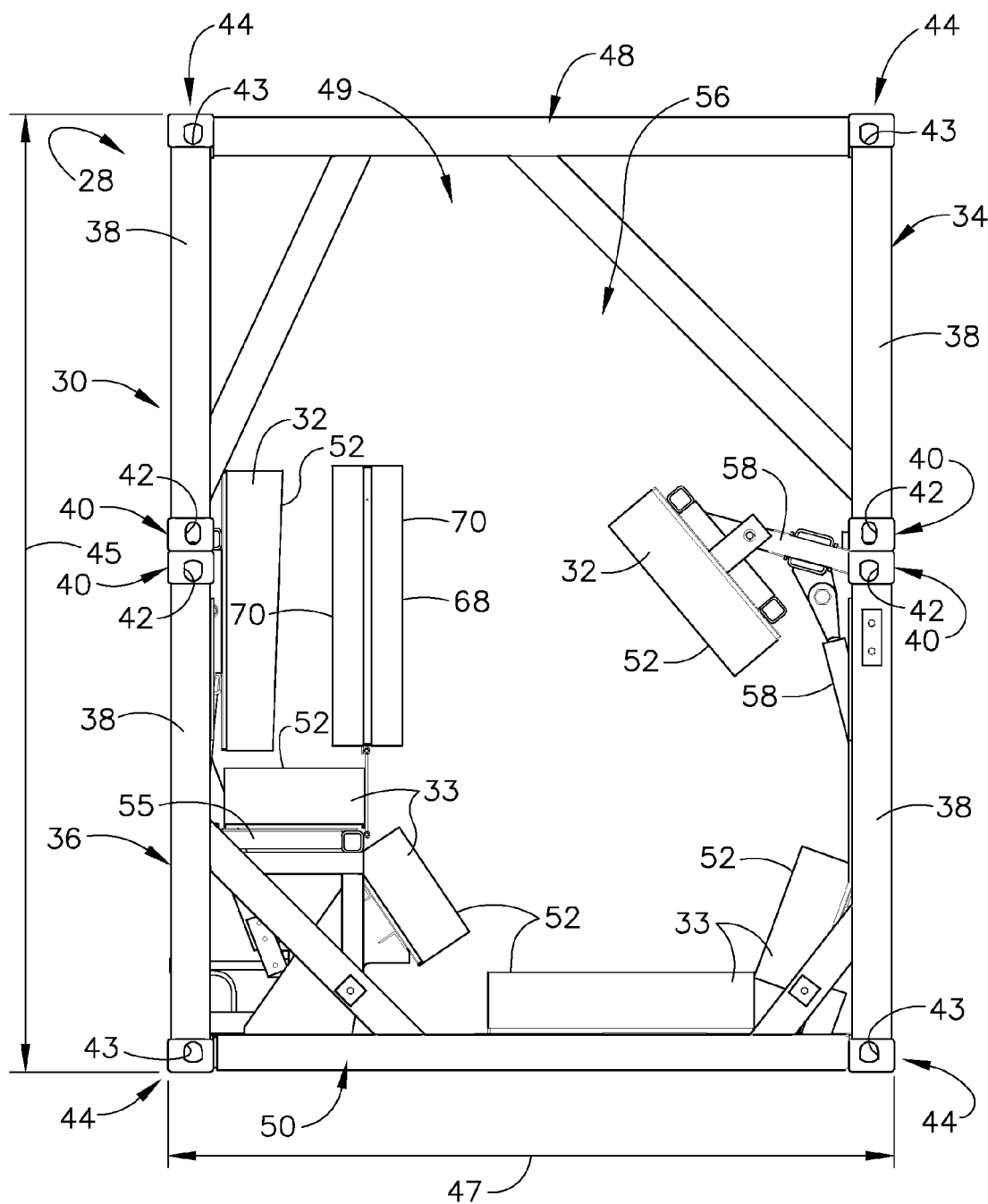
FIG. 3 is an unexploded side view of the fixture shown in FIG. 2.
Figure 4:
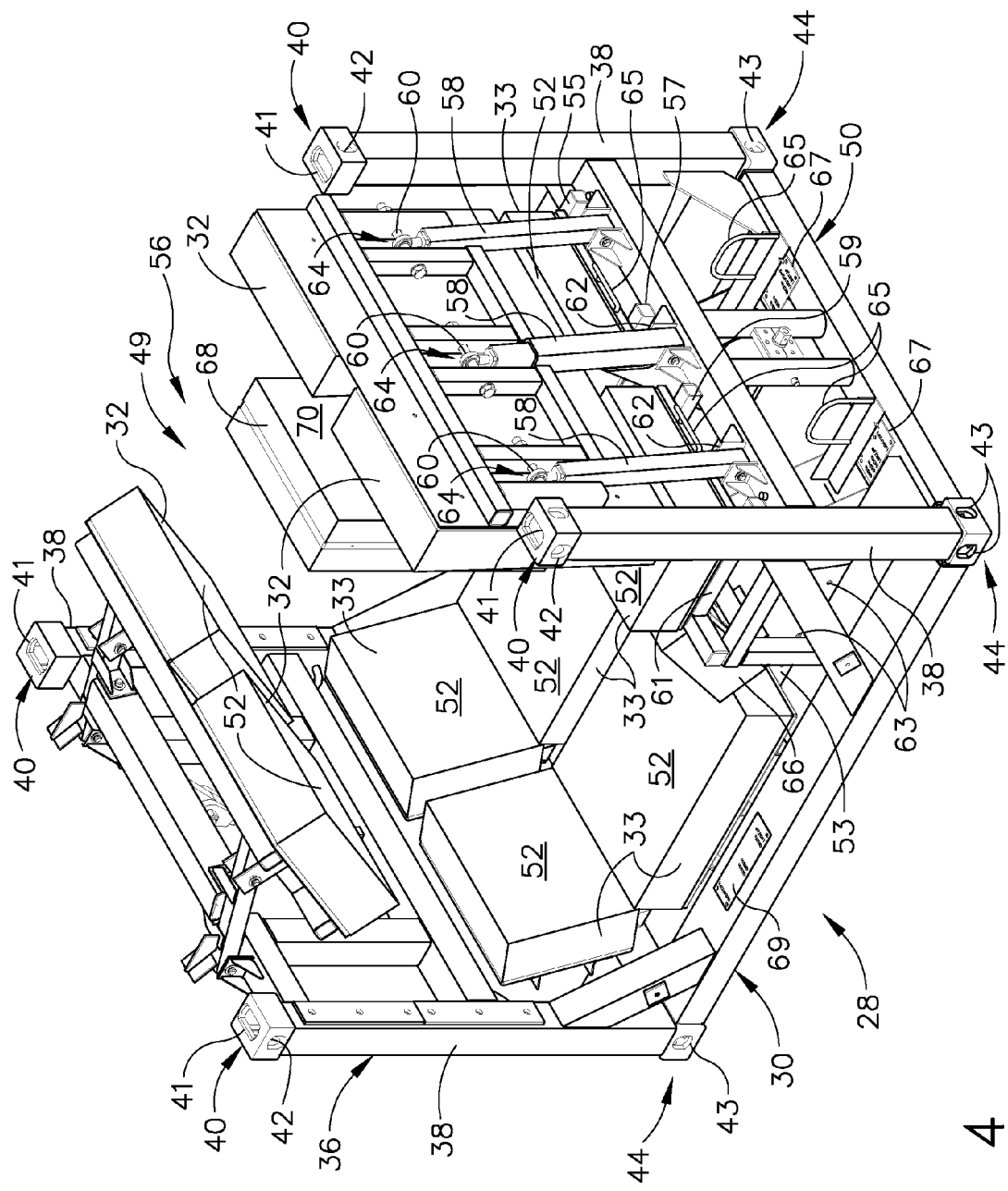
FIG. 4 is a perspective view of a portion of the fixture shown in FIG. 2.
Figure 5:
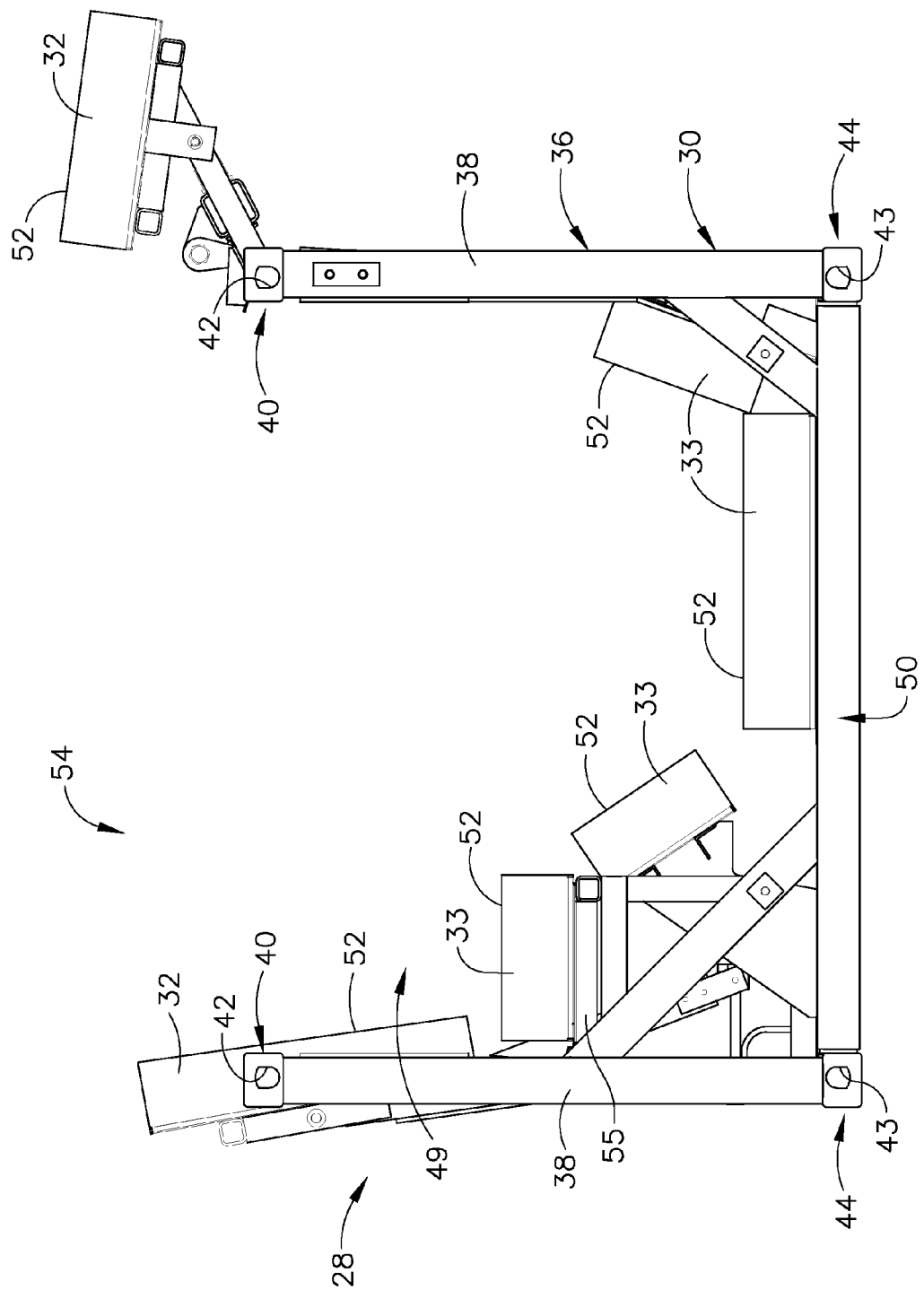
FIG. 5 is a side view of the fixture portion shown in FIG. 4.

FIG. 2 is a partially exploded perspective view of an exemplary embodiment of a fixture 28 for supporting and/or transporting one or more of wind turbine rotor blades 24 (shown in FIG. 1). FIG. 3 is an unexploded side view of fixture 28. FIG. 4 is a perspective view of a portion of fixture 28. FIG. 5 is a side view of the portion of fixture 28 shown in FIG. 4. Referring to FIGS. 2-5, fixture 28 includes a frame 30 and a plurality of cushions 32 and 33 coupled to frame 30. Generally, fixture 28 supports at least a portion of one or more wind turbine rotor blades 24 for, for example, storage and/or transportation by any suitable means and/or method, such as, but not limited to, truck, ship, and/or rail. Generally, cushions 32 and 33 support and/or contain a portion of one or more blades 24 and may facilitate reducing or eliminating vibrational stresses and/or other forces induced into blades 24, for example during transportation, loading into fixture 28, and/or unloading from fixture 28.

In the exemplary embodiment, frame 30 includes an upper section 34 and a lower section 36 to support, store, and/or transport blades 24. Upper and lower sections 34 and 36 may be coupled together in any suitable manner, fashion, arrangement, configuration, orientation, and/or by any suitable structure and/or means. In the exemplary embodiment, upper and lower sections 34 and 36 each include a plurality of legs 38 and end portions 40 which couple to a corresponding leg end portion 40 of the other section 34 or 36, as shown in FIGS. 2 and 3.

In some embodiments, legs 38 interconnect with fasteners (not shown) and a plurality of openings 42 within leg end portions 40. In some embodiments, one or more of leg end portions 40 may also include an opening 41 and/or an extension (not shown) for interconnection with opening 41 and/or an extension of a corresponding leg 38 on another section 34 or 36 to facilitate alignment and/or intercoupling of upper and lower sections 34 and 36. Although upper and lower sections 34 and 36 are each illustrated with four legs 38, sections 34 and 36 may each include any number of legs 38.

In some embodiments, two fixtures 28 may be coupled together in any suitable manner, fashion, arrangement, configuration, orientation, and/or by any suitable structure and/or means. In the exemplary embodiment, one or more end portions 44 of legs 38 that are opposite leg end portions 40 include an opening 46 and/or an extension (not shown) for interconnection with an opening 46 and/or extension of a corresponding leg 38 on a section 34 or 36 of another fixture 28 to facilitate stacking two fixtures 28 (not shown in FIGS. 2-5). In some embodiments, one or more leg end portions 44 may also include an opening 43 to facilitate coupling and stacking of two fixtures 28. In some embodiments, only lower section 36 may be provided. For example, in some embodiments, only lower section 36 is used when transporting one or more blade(s) 24 over land.

Although frame 30 may have any size and/or shape, in some embodiments frame 30 is sized and/or shaped to comply with restrictions on predetermined sized and/or shaped loads. Such restrictions on predetermined sized and/or shaped loads may include, but are not limited to, regional restriction, national restrictions, international restrictions, restrictions of transportation over land, restrictions of transportation over water, and/or restrictions of air transportation. For example, some known transport regulations within the United States restrict loads to a width of about 2.591 meters and a height of about 4.42 meters, some known Canadian transport regulations restrict loads to a width of about 2.599 meters and a height of about 4.312 meters, some known European transport regulations restrict loads to a width of between about 2.5 and about 2.9 meters and a height of between about 4 and about 4.5 meters, and some transport regulations within Asia restrict loads to a width of between about 2.4 meters and about 3.2 meters, and a height of about 4.1 meters. Accordingly, in some embodiments, frame 30 has a maximum height 45 of between about 2 meters and about 5 meters, and preferably, about 3.45 meters. Moreover, in some embodiments frame 30 has a maximum width 47 of between about 1.5 meters and about 3.5 meters, and preferably, about 2.591 meters.

When upper and lower sections 34 and 36 are coupled together, a space 49 is generally defined between legs 38, a top portion 48 of upper section 34, and a bottom portion 50 of lower section 36. Space 49 receives a portion of blades 24 and cushions 32 and 33 that extend into space 49 for engaging the blade portions to facilitate containing and/or supporting blades 24 within space 49. Although cushions 32 and 33 are illustrated as being coupled to only frame lower section 36, cushions 32 and 33 may be coupled to any portion of frame 30. For example, in some embodiments, one or more cushions 32 and/or 33 may be coupled to upper section 34, lower section 36 may not include any cushions 32 and/or 33 coupled thereto, and/or one or more cushions 32 and/or 33 may be coupled to both upper and lower sections 34 and 36.

Cushions 32 and 33 may each include any suitable material that enables cushions 32 and 33 to function as described herein. In some embodiments, cushions 32 and/or 33 include compressed natural fibers with latex that enable cushions 32 and 33 to function as described herein. Moreover, in some embodiments, cushions 32 and/or 33 are at least partially covered with a protective sheet such as, but not limited to, ethylene propylene diene monomer (EPDM) rubber and/or polyurethane. Cushions 32 and 33 may each include any suitable density that allows cushions 32 and 33 to function as described herein. In some embodiments, cushions 32 and 33 include a material(s), such as, but not limited to, memory foam, that at least partially retains a shape memory such that cushions 32 and 33 at least partially return to their original shape after compression, for example after one or more blades 24 are removed from fixture after transportation and/or storage thereof.

In some embodiments, cushions 32 and 33 facilitate reducing or eliminating vibrational stresses and/or other forces induced into one or more blades 24. For example, cushions 32 and 33 facilitate reducing or eliminating damage to blades 24 caused by forces up to about 4G that are exerted on blades 24 during transportation, loading into fixture 28, and/or unloading from fixture 28.

In some embodiments, one or more cushions 32 and 33 facilitate a secure coupling between one or more blades 24 and fixture 28, to facilitate retaining blades 24 within fixture 28 and in position, such as, but not limited to, a location and/or an orientation, relative to cushions 32 and 33 and fixture 28. For example, a surface 52 of one or more cushions 32 and/or 33, facilitates increasing an amount of friction and/or stiction between surface 52 and a surface (not shown) of a blade 24 that is engaged by surface 52 to facilitate a secure coupling between blade 24 and fixture 28. In some embodiments, the stiction and/or friction provided by cushions 32 and/or 33 is sufficient to retain one or more blades 24 within fixture 28 and in position relative to cushions 32 and 33 and fixture 28 during transportation and/or storage of blade(s) 24.

Surface 52 may be configured to facilitate increasing friction and/or stiction using any suitable structure and/or means, such as, but not limited to, a texture that facilitates increasing friction and/or stiction. Surface 52 may include any texture(s) and/or material(s) that enable cushions 32 and/or 33 to facilitate retaining blades 24 within fixture 28 and in position relative to cushions 32 and 33 and fixture 28. For example, in some embodiments surface 52 of one or more cushions 32 and/or 33 is at least partially defined by (EPDM) rubber to facilitate retaining blades 24 within fixture 28 and in position relative to cushions 32 and 33 and fixture 28.

In some embodiments, cushions 32 and 33 are each selectively positionable in two or more positions. As such, a position, such as, but not limited to, a location and/or an orientation, of each cushion 32 and 33 with respect to frame 30 can be adjusted with respect to a portion of one or more blades 24 received within space 49. Such adjustment may facilitate loading blades 24 into fixture 28, unloading blades from fixture 28, and/or selectively positioning cushions 32 and 33 to support differently sized and/or shaped blades 24 using fixture 28. For example, each cushion 32 and 33 is positionable with respect to one another and frame 30 such that a collective general shape of the arrangement of cushion surfaces 52 can be adjusted to accommodate a particular size and/or shaped blade portion, such that cushions 32 and 33 are adjustable to receive differently sized and/or shaped blades 24. More specifically, cushions 32 are each movably coupled to frame 30 for movement with respect to frame 30 between a position 54, shown in FIG. 5, that facilitates loading a blade 24 into frame space 49, a position 56, shown in FIG. 2-4, wherein cushion surfaces 52 are positioned to engage one or more blades 24 having a predetermined size and/or shape to contain and/or support blade(s) 24, and another position (not shown) wherein surfaces 52 are positioned to engage one or more blades 24 having another different predetermined size and/or shape to contain and/or support blade(s) 24.

Cushions 32 may be configured for any suitable type, direction, and/or amount of movement with respect to frame 30, each other, members 58 (described below), any other component of fixture 30, and/or blades 24 that enables cushions 32 to function as described herein. Moreover, cushions 32 may include any structure and/or means, that enable cushions 32 to move as described and/or illustrated herein. For example, in the exemplary embodiment, cushions 32 are each coupled to one or more members 58 extending from frame 30.

Members 58 are hingedly coupled to frame 30 such that cushions 32 are rotable respect to frame 30. Cushions 32 are also hingedly coupled to members 58 such that cushions 32 are rotable with respect to members 58. Members 58 may be hingedly coupled to frame 30, and cushions 32 may be hingedly coupled to members 58, using any suitable structure and/or means, such as in the exemplary embodiment, but not limited to, rod ends 60 and/or u-joints 62.

In some embodiments, one or more of members 58 is configured to telescope to facilitate movement of cushions 32. Cushions 32 may each be locked into one or more predetermined positions using any suitable method, process, structure, and/or means. For example, in the exemplary embodiment cushions 32 are locked into position (e.g., position 54 shown in FIG. 5 and/or position 56 shown in FIG. 2-4) by tightening u-joints 62 and/or joints 64 that include rod ends 60. In some embodiments, a plurality of fasteners used to lock cushions 32 into position may each be sized generally the same such that each cushion 32 can be locked into position using the same tool (not shown), such as, but not limited to, a wrench.

Cushions 33 may include any structure and/or means that enable cushions 33 to be selectively positionable in two or more positions as described and/or illustrated herein. For example, in the exemplary embodiment each cushion 33 is selectively positionable in two or more positions (only one position for each cushion 33 is illustrated herein) by sliding cushions 33 along one or more corresponding members 51, 53, 55, 57, 59, and 61 of fixture frame 30. Cushions 33 may each be locked into one or more predetermined positions using any suitable method, process, structure, and/or means. For example, in the exemplary embodiment frame members 51, 53, 55, 57, 59, and 61 each include a plurality of openings 63 for receiving a locking pin (not shown) to lock cushions 33 into position along the corresponding frame member(s) 51, 53, 55, 57, 59, and 61. In some embodiments, one or more of cushions 33 includes a handle 65 for moving cushions 33 along the corresponding frame member(s) 51, 53, 55, 57, 59, and 61. Moreover, in some embodiments, frame 30 and/or cushions 33 include indicia indicating positions for particular blade types. For example, in the exemplary embodiment frame members 51 and 53 each include an identification plate 67 indicating positions for particular blade types.

In some embodiments, fixture 28 includes a plurality of cushions (not shown), coupled to frame 30 in any suitable manner, fashion, arrangement, location, orientation, configuration, and/or by any suitable structure and/or means, that can generally only be positioned in one position relative to frame 30. For example, in some alternative embodiments one or more of cushions 32 and/or cushions 33 can generally only be coupled to frame 30 in one position and are non-movable relative to frame 30 once coupled thereto. Fixture 28 may include any number of cushions that can generally only positioned in one position. In some embodiments, fixture 28 does not include any cushions that can only be positioned in one position.

In the exemplary embodiment, fixture 28 includes a partition 68 for use separating two different blades 24 received within frame space 49. In the exemplary embodiment, partition 68 is cushioned as described herein with respect to cushions 32 and 33. Accordingly, in some embodiments partition 68 facilitates reducing or eliminating vibrational stresses and/or other forces induced into blades 24, for example during transportation, loading into fixture 28, and/or unloading from fixture 28. However, in some embodiments partition 68 is not cushioned. In some embodiments, a surface 70 of one or more partitions 68 includes a texture that facilitates increasing an amount of friction an/or stiction between surface 70 and a surface (not shown) of a blade 24 that is engaged by surface 70 to facilitate a secure coupling between blades 24 and fixture 28, for example, to facilitate retaining blades 24 within fixture 28 and in position relative to cushions 32 and 33 and fixture 28.

In some embodiments, partition 68 is configured to be coupled to frame 30 in two or more different positions (only one position for partition 68 is illustrated herein), such as, but not limited to, orientations and/or locations, to facilitate loading blades 24 into fixture 28, unloading blades from fixture 28, and/or supporting differently sized and/or shaped blades 24 using fixture 28. For example, in some embodiments, partition 68 is movably coupled to frame 30 for movement with respect to frame 30, for example movement as described herein with respect to cushions 32. However, in the exemplary embodiment, partition 68 is generally coupled to frame 30 such that partition 68 can generally only be coupled to frame in one position. Partition 68 may be coupled or fixedly secured to frame 30 in any suitable manner, fashion, arrangement, location, orientation, configuration, and/or by any suitable structure and/or means that enables partition 68 to function as described and/or illustrated herein. Although one partition 68 is illustrated, fixture 28 may include any number of partitions 68. In some embodiments, fixture 28 does not include a partition 68. Moreover, in some embodiments (whether partition is coupled to frame 30 in more than one position) partition 68 is removed prior to loading one or more blade(s) 24 into fixture 28 and positioned within fixture 28 after one or more blade(s) 24 have been loaded into fixture 28.

In some embodiments, fixture frame 30 includes an identification plate 69 coupled thereto for identifying frame 30, one or more blade(s) 24 supported by frame 30, a position of one or more of cushions 32, cushions 33, and/or partition 68, and/or any other information relevant to fixture 28 and/or storage and/or transportation of one or more blade(s) 24.

Figure 6:
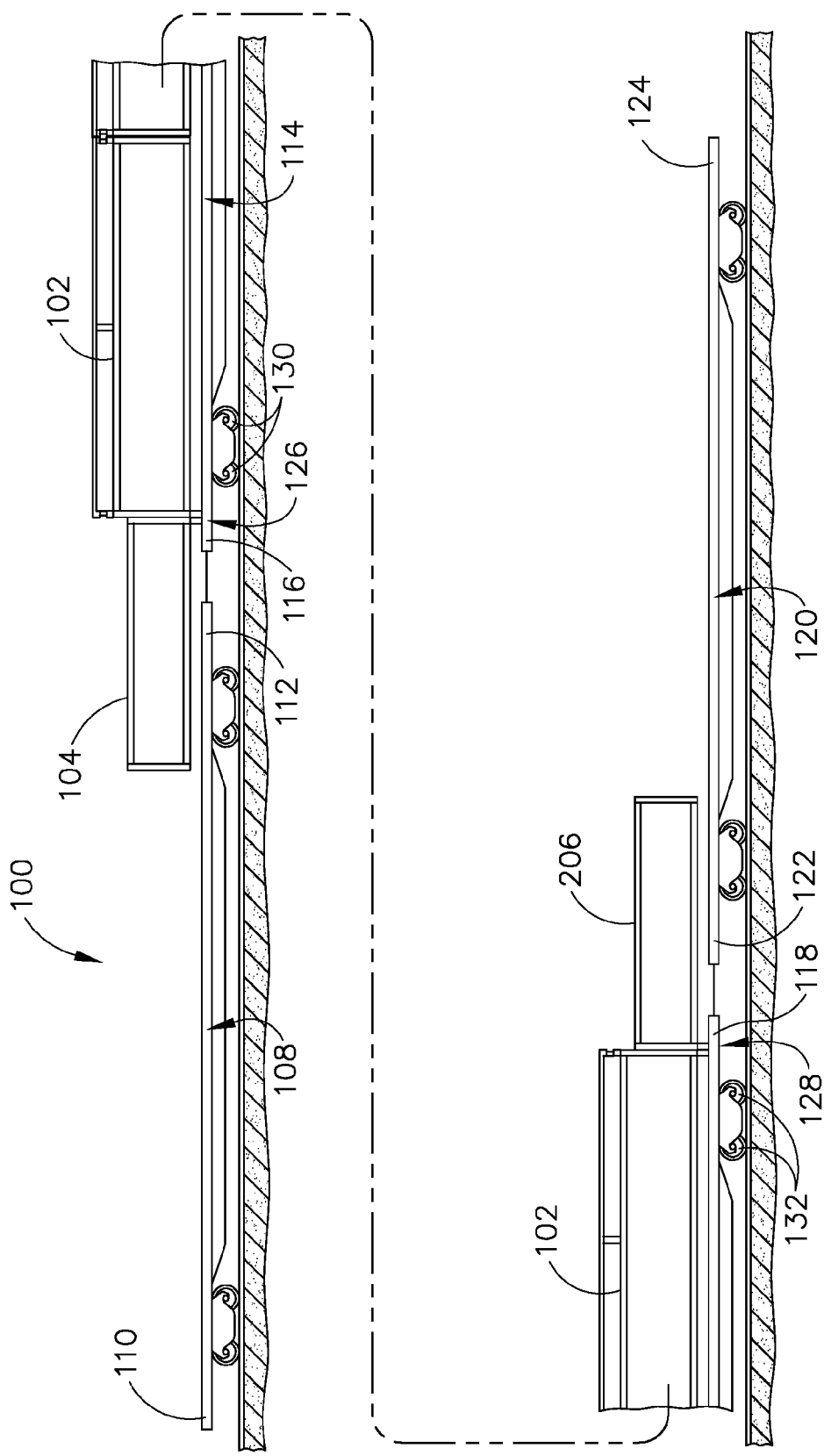
FIG. 6 is a side view of a exemplary embodiment of a known system for transporting wind turbine rotor blades by rail.

FIG. 6 is a side view of an exemplary embodiment of a known system 100 for transporting wind turbine rotor blades such as, but not limited to, blades 24 by rail. Known system 100 includes a container 102 that includes a first container end 104 and a second container end 106. Although container 102 is described as a single container, container 102 sometimes is a plurality of individual containers coupled together such that the entire container contains at least one blade therein.

System 100 also includes a first railcar 108 including opposing first and second longitudinal ends 110 and 112, a second railcar 114 including opposing first and second longitudinal ends 116 and 118, and a third railcar 120 including opposing first and second longitudinal ends 122 and 124. Second end 112 of first railcar 108 is coupled to first end 116 of second railcar 114, and second end 118 of second railcar 114 is coupled to first end 122 of third railcar 120. Further, system 100 includes a plurality of container mounts 126 and 128. Container mounts 126 and 128 are pedestal systems that are fastened to railcars 108, 114, and 122 to mount container 102 directly above railcars 108, 114, and 120. More specifically, container 102 is generally centered and coupled to container mounts 126 and 128 that are welded on second railcar 114 such that first container end 104 partially overhangs first railcar 108 and second container end 106 partially overhangs third railcar 120.

Although the known blade arrangements and containers described above facilitate decreasing transportation space on railcars, such known containers 102 also are assembled large enough to contain blades 24 entirely to protect such blades from damage. However, such arrangements increase size and/or weight of container 102. As a result, rail transportation of larger wind turbine components such as, but not limited to, blades 24 increase associated rail transportation costs of larger wind turbines.

Figure 7:
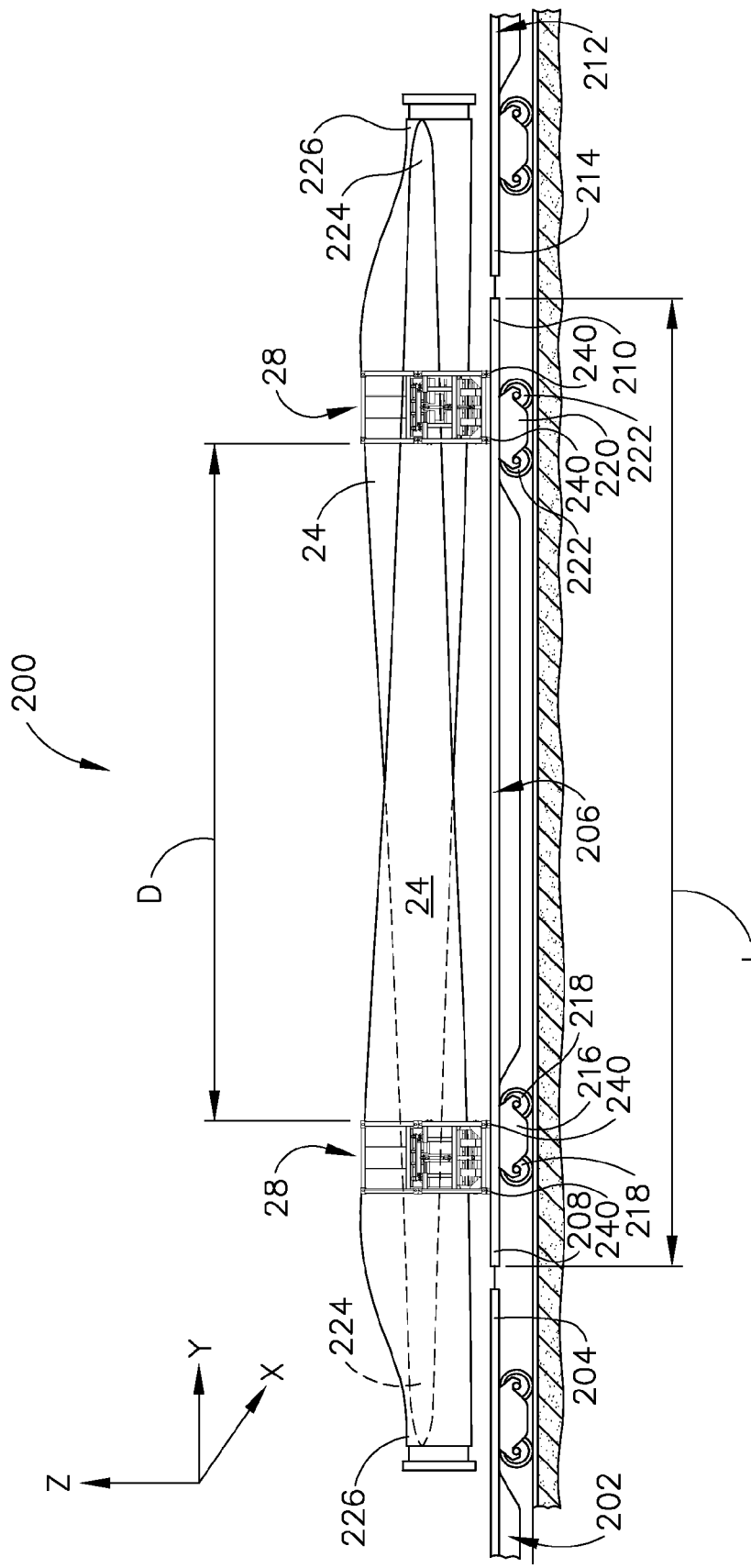
FIG. 7 is a side view of an exemplary system for transporting wind turbine rotor blades supported by two of the fixtures shown in FIGS. 2-5 via rail.
Figure 8:
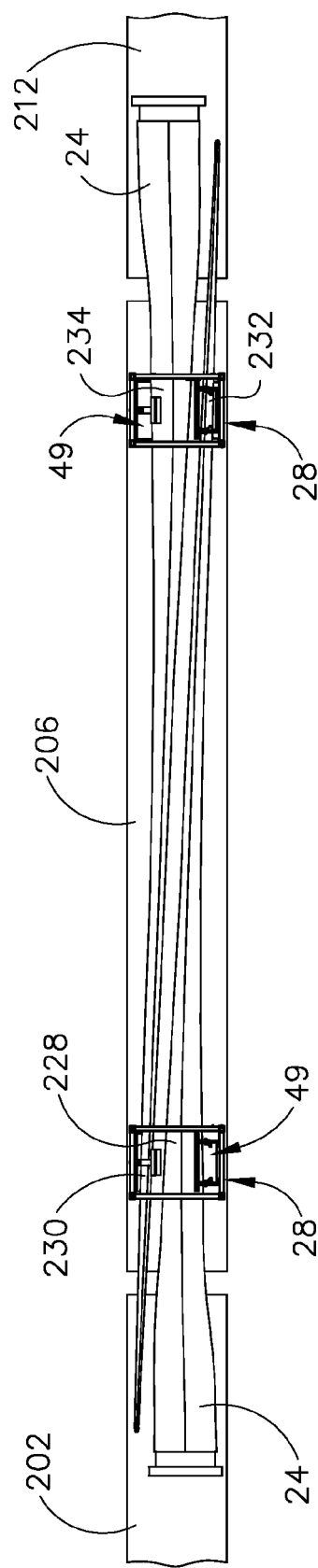
FIG. 8 is a top view of the exemplary system shown in FIG. 7.
Figure 9:
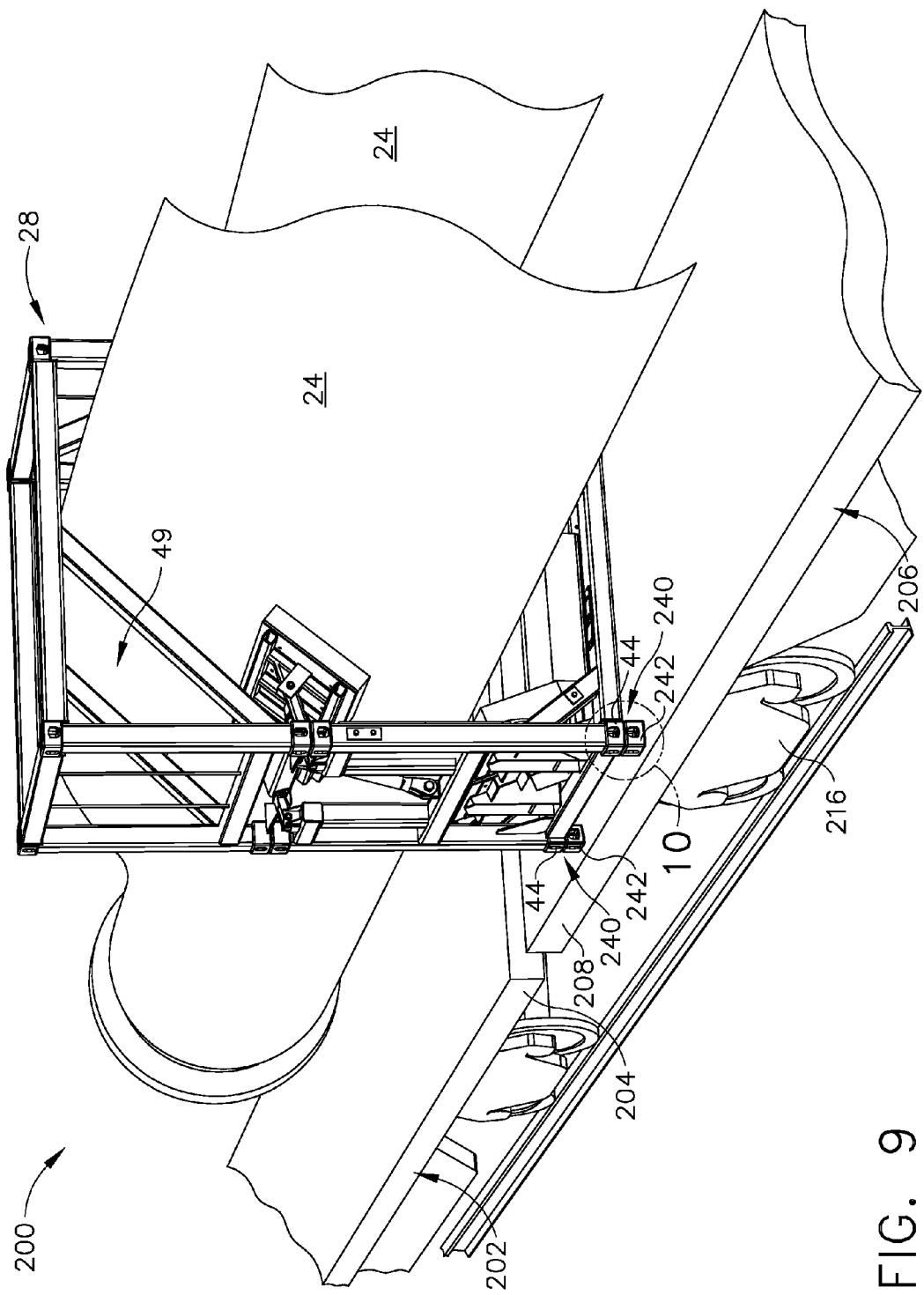
FIG. 9 is a partial perspective view of the exemplary system shown in FIGS. 7 and 8.

FIG. 7 is a side view of an exemplary system 200 for transporting wind turbine rotor blades such as, but not limited to, rotor blades 24 supported by two of the fixtures (shown in FIGS. 2-5) via rail. FIG. 8 is a top view of system 200 shown in FIG. 7. FIG. 9 is a partial perspective view of system 200 shown in FIGS. 7 and 8. In the exemplary embodiment, system 200 includes at least a first railcar 202 including a first longitudinal end (not shown) and an opposing second longitudinal end 204, a second railcar 206 including opposing first and second longitudinal ends 208 and 210, and a third railcar 212 including a first longitudinal end 214 and an opposing second longitudinal end (not shown). Second end 204 of first railcar 202 is coupled to first end 208 of second railcar 206, and second end 210 of second railcar 206 is coupled to first end 214 of third railcar 212. First, second, and third railcars 202, 206, and 212 each include wheels that are at opposite longitudinal ends of the respective railcar. However, only a first wheel assembly 216 that includes wheel pairs 218 and a second wheel assembly 220 that includes wheel pairs 222 have been labeled for ease of understanding.

In the exemplary embodiment, a platform length L of second railcar 206 is between approximately 20 meters (m) (65 feet (ft)) and 28 meters (m) (91 feet (ft)) and all subranges therebetween or, more specifically, between approximately 27 meters (m) (89 feet (ft)) and 28 meters (m) (91 feet (ft)). Also, in the exemplary embodiment, a load limit on the platform is between approximately 88.86 metric tons (mt) (195,902 pounds (lbs)) and 337.47 metric tons (mt) (743,994 pounds (lbs)) and all subranges therebetween, depending on the type of railcar (discussed later) and the number of axels.

Although length L may be any length that facilitates overhanging blades 24 from at least one longitudinal end portion of a railcar, the length of the railcar must comply with some size restrictions. In addition, even though load weight may be any weight that is capable of being supported by the railcar, the load limits of the railcar must also comply with some weight restrictions. Restrictions on predetermined size and load limits may include, but are not limited to, regional restrictions, national restrictions, international restrictions, and/or land restrictions to facilitate reducing damage to blades 24. Such restrictions also facilitate ensuring blades 24 clear bridges, overpasses, uneven terrain, corners, and/or other land obstructions to facilitate reducing damage that may degrade blade performance.

In the exemplary embodiment, system 200 also includes two fixtures 28 configured to receive rotor blades, such as blades 24. Each blade 24 includes a tip portion ("tip") 224 and a root portion ("root") 226. In the exemplary embodiment, portions 228 and 230 of each blade 24 are received within space 49 of first fixture 28, and portions 232 and 234 of each blade 24 are received within space 49 of second fixture 28. More specifically, two blades 24 may be disposed within spaces 49 such that tip 224 of one blade 24 is disposed adjacent root 226 of another blade 24. Alternatively, blades 24 may be located, oriented, aligned, and/or arranged in any manner with respect to each other. Although fixtures 28 are illustrated as supporting two blades 24, fixtures 28 may support any number of blades 24.

In the exemplary embodiment, fixtures 28 are also configured to be coupled to a railcar, such as second railcar 206. Fixtures 28 each include a plurality of coupling structures 240 that may be coupled to a same railcar using any suitable method, structure, and/or means such as, but not limited to, twist-locks, chains, ropes, and/or other coupling devices. The coupling of fixtures 28 to a railcar, such as second railcar 206, may be similar for both fixtures. As such, only the coupling of fixture 28 to railcar 206 is described in more detail below.

Figure 10:
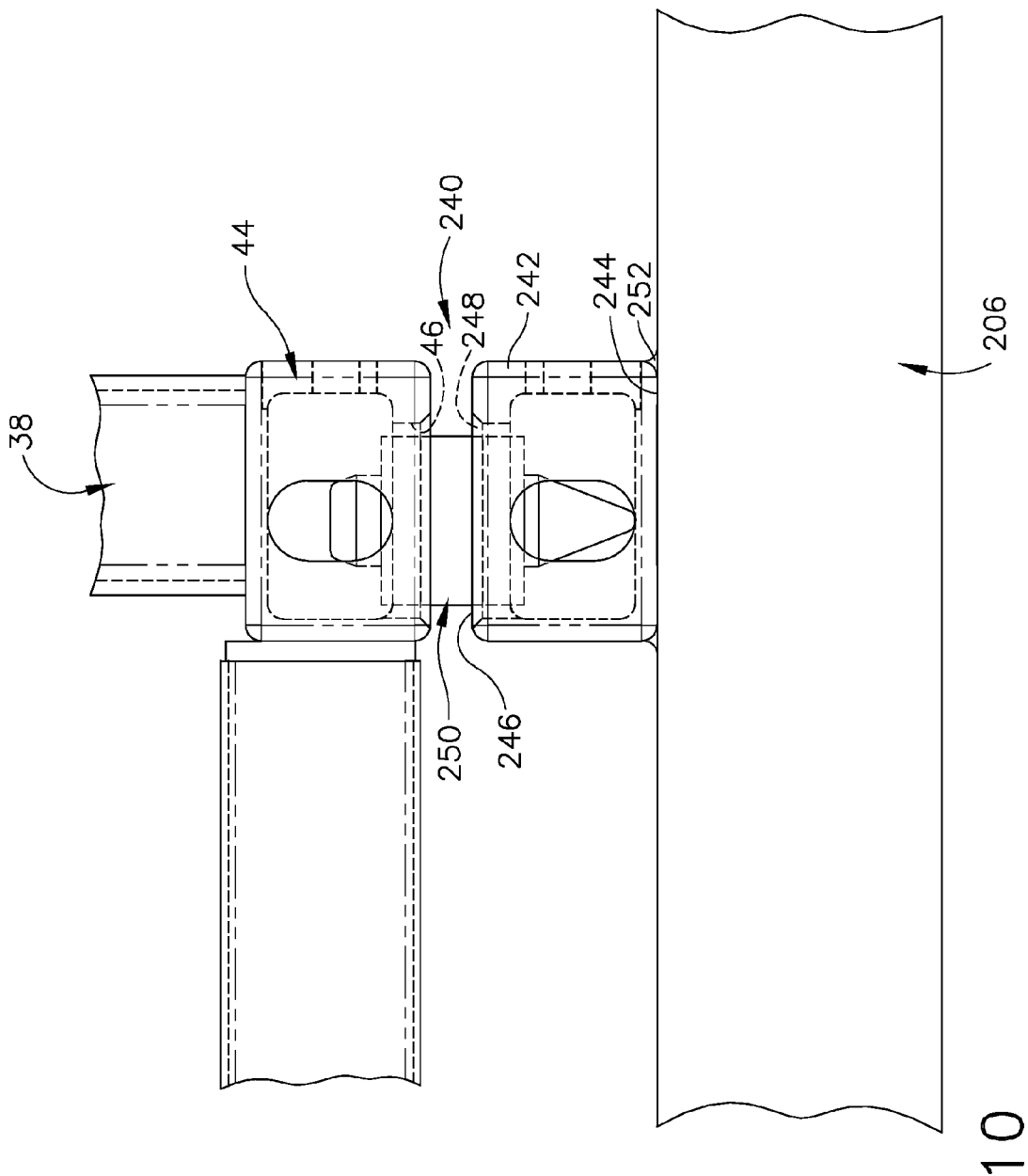
FIG. 10 is an enlarged side view of a coupling structure taken along area 6 of the exemplary system shown in FIGS. 7,8, and 9.

FIG. 10 is an enlarged side view of coupling structure 240 taken along area 10 (shown in FIG. 9). Each coupling structure 240 includes leg end portion 44 of fixture 28 and a connector box 242 having a bottom surface 244, an opposing top surface 246, and an opening 248 defined in top surface 246. Furthermore, each coupling structure 240 includes a twist-lock 250 positioned within openings 46 and 248 to couple leg end portion 44 and connector box 242.

During initial assembly, four connector boxes 242 may be positioned and spaced apart on second railcar 206 at positions corresponding to four leg end portion 44 of fixture 28. Each twist-lock 250 is partially positioned in a respective connector box opening 248. Leg end portions 44 of fixture 28 are positioned above a respective twist-lock 250 such that a portion of twist-lock 250 is received within a respective leg end portion 44 of fixture 28. Twist-lock 250 may be turned to lock and unlock leg end portion 44 with respect to connector box 242. Connector boxes 242 may be coupled to second railcar 206 by any known fastening devices such as, but limited to, fasteners, adhesives, and/or welds 252. Although twist-locks 250 are described as coupling leg end portions 44 to connector boxes 242, it should be appreciated that any known fastening device may be used for such connection.

In the exemplary embodiment, first fixture 28 is coupled to second railcar 206 at a first location disposed between first longitudinal end 208 and first wheel assembly 216, and second fixture 28 is coupled to second railcar 206 at a second location disposed between second longitudinal end 210 and second wheel assembly 220. Fixtures 28 are spaced apart to fit a width of second railcar 206 and a distance D as measured along platform length L of second railcar 206. For example, distance D is between approximately 18 meters (m) (60 feet (ft)) and 21 meters (m) (68 feet (ft)) and all subranges therebetween or, more specifically, between approximately 19 meters (m) (64 feet (ft)) and 20 meters (m) (67 feet (ft)). More specifically, first fixture 28 is substantially centered over at least one of first wheel assembly wheel pairs 218, and second fixture 28 is substantially centered over at least one second wheel assembly wheel pairs 222. As such, fixtures 28 are positioned to facilitate balancing an amount of sagging and blade overhang with respect to any railcar, such as second railcar 206, supporting the blades.

In the exemplary embodiment, as discussed above, additional railcars such as first railcar 202 and/or third railcar 212 are coupled to opposing first and second longitudinal ends 208 and 210 of second railcar 206 to further facilitate reducing damage to blades 24. For example, the length of blades 24 is generally longer than the length of a railcar platform, such as second railcar 206, in which blades 24 are loaded. Therefore, portions of blades 24 overhang at least one railcar end 208 and 210. More specifically, in the exemplary embodiment, blades 24 are mounted to second railcar 206 via fixtures 28 such that tip 224 and root 226 portions of each blade 24 hang over opposing longitudinal ends 208 and 210 of second railcar 206. To compensate for overhanging portions of blades 24, first railcar 202 and third railcar 212 are coupled to opposing longitudinal ends 208 and 210 such that opposing overhanging blade 24 portions, such as tip 224 and root 226 portions, overlap second longitudinal end 204 of first railcar and first longitudinal end 214 of third railcar 212, respectively.

Although first, second and third railcars 202, 206, and 212 have been described as flat-bed railcars, it should be appreciated that first, second and third railcars 202, 206, and 212 may be any type of railcar that may perform the below described functions. More specifically, in the exemplary embodiment, it should be appreciated that first, second and/or third railcars 202, 206, and 212 may be any type of full-sized railcar capable of carrying a load of wind turbine components. Such railcars may include heavy duty railcars such as, but not limited to, depressed center flat cars, ordinary flat cars, flat cars with holes, specialized heavy duty railcars, articulated cars, and other railcars capable of supporting a load of wind turbine components.

Because availability of full-sized railcars may be limited, it should also be appreciated that first railcar 202 and third railcar 212 may alternatively include various types of smaller-sized railcars that are capable of underlying overhanging blade 24 portions without supporting a load thereon. Such smaller-sized railcars may include idler cars that are empty unloaded flat cars used to protect over-hanging loads in which no part of a load rests on the idler cars. For example, at least one idler car may be coupled between two loaded, full-sized railcars, such as second railcar 206, to compensate for overhanging blade portions positioned on each loaded opposing railcar. Alternatively, at least one idler car may be coupled to an end car of a series of articulated cars.

Regardless of the type of railcars used for first, second and third railcars 202, 206, and 212, it should be appreciated that any combination of above described respective railcars may be used as long as fixtures 28 are both mounted on a same railcar to support a load of each blade 24 provided thereon. As a result, first, second and third railcars 202, 206, and 212 facilitate turning corners without damage to blades 24 because overhanging blade 24 portions are not mounted on first and third railcars 202 and 212.

The fixtures, assemblies, and methods described and/or illustrated herein may also facilitate reducing a cost of transporting rotor blades by coupling at least two fixtures on a same load supporting railcar for supporting wind turbine components such as, but not limited to, rotor blades. Although the fixtures, assemblies, and methods described and/or illustrated herein are described and/or illustrated with respect to rotor blades, and more specifically wind turbine rotor blades, practice of the fixtures, assemblies, and methods described and/or illustrated herein is not limited to wind turbine rotor blades, nor rotor blades. Rather, the fixtures, assemblies, and methods described and/or illustrated herein are applicable to transporting any load having a length longer than a length of a railcar platform that supports the load.

Exemplary embodiments of fixtures, assemblies, and methods are described and/or illustrated herein in detail. The fixtures, assemblies, and methods are not limited to the specific embodiments described herein, but rather, components of each fixture and each assembly, as well as steps of each method, may be utilized independently and separately from other components and steps described herein. Each component, and each method step, can also be used in combination with other components and/or method steps.

While the invention has been described in terms of various specific embodiments, those skilled in the art will recognize that the invention can be practiced with modification within the spirit and scope of the claims.

What is claimed is:

1. A mounting system for at least one of supporting and transporting a unitary load, said mounting system comprising:
   a plurality of adjacent railcars comprising a first railcar, said first railcar comprising spaced first and second wheel assemblies each including at least one wheel pair;
   a first frame coupled to said first railcar, said first frame having a first frame space defined between at least two portions of said first frame, said first frame comprising at least one first frame cushion extending into and selectively positionable within said first frame space, said at least one first frame cushion hingedly coupled to said first frame, said at least one first frame cushion configured to receive a first portion of the unitary load within said first frame space; and
   a separate second frame coupled to said first railcar, said second frame having a second frame space defined between at least two portions of said second frame, said second frame comprising at least one second frame cushion extending into and selectively positionable within said second frame space, said at least one second frame cushion hingedly coupled to said second frame, said at least one second frame cushion configured to receive a second portion of the unitary load within the second frame space, wherein said second frame is spaced from said first frame to facilitate at least one of partially containing and partially supporting the load, and wherein said first frame is substantially centered over said at least one wheel pair of said first wheel assembly, and said second frame is substantially centered over said at least one wheel pair of said second wheel assembly.

2. A mounting system in accordance with claim 1 wherein said plurality of railcars comprises a second railcar coupled to a first longitudinal end of said first railcar, said second railcar at least partially overlapping with an overhanging portion of the load.

3. A mounting system in accordance with claim 2 wherein said plurality of railcars comprises a third railcar coupled to a second longitudinal end of said first railcar, said third railcar at least partially overlapping with another overhanging portion of the load.

4. A mounting system in accordance with claim 3 wherein at least one of said second railcar and said third railcar is an unloaded idler car.

5. A mounting system in accordance with claim 1 wherein said first railcar is an articulated car.

6. A mounting system in accordance with claim 1 wherein the load comprises at least one wind turbine component.

7. A mounting system in accordance with claim 6 wherein the at least one wind turbine component comprises at least one wind turbine rotor blade.

8. A method for at least one of supporting and transporting at least one unitary load, said method comprising:
   providing a plurality of adjacent railcars comprising providing a first railcar, the first railcar comprising spaced first and second wheel assemblies each including at least one wheel pair;
   coupling a first frame to the first railcar, the first frame having a first frame space defined between at least two portions of the first frame, the first frame comprising at least one first frame cushion extending into and selectively positionable within the first frame space, the at least one first frame cushion hingedly coupled to the first frame;
   receiving a first portion of the at least one unitary load within the first frame space;
   coupling a separate second frame to the first railcar, the second frame having a second frame space defined between at least two portions of the second frame, the second frame comprising at least one second frame cushion extending into and selectively positionable within the second frame space, the at least one second frame cushion hingedly coupled to the second frame; and
   receiving a second portion of the at least one unitary load within the second frame space, wherein coupling a first frame to the first railcar comprises substantially centering the first frame over the at least one wheel pair of the first wheel assembly, and wherein coupling a second frame to the first railcar comprises spacing the second frame away from the first frame to facilitate at least one of partially containing and partially supporting the at least one unitary load, and substantially centering the second frame over the at least one wheel pair of the second wheel assembly.

9. A method in accordance with claim 8 wherein providing a plurality of railcars comprises coupling a second railcar to a first longitudinal end of the first railcar, and at least partially overlapping the second railcar with an overhanging portion of the at least one unitary load.

10. A method in accordance with claim 9 wherein providing a plurality of railcars comprises coupling a third railcar coupled to a second longitudinal end of the first railcar, and at least partially overlapping the third railcar with another overhanging portion of the load.

11. A method in accordance with claim 10 wherein at least one of coupling a second railcar and coupling a third railcar comprises coupling an unloaded idler car.

12. A method in accordance with claim 8 wherein providing a first railcar comprises providing an articulated car.

13. A method in accordance with claim 8 wherein the load comprises at least one wind turbine component.

14. A method in accordance with claim 13 wherein the at least one wind turbine component comprises at least one wind turbine rotor blade.

15. A method for at least one of supporting and transporting at least one rotor blade, said method comprising:
   providing a plurality of adjacent railcars comprising providing a first railcar, the first railcar comprising spaced first and second wheel assemblies each including at least one wheel pair;
   coupling a first frame to the first railcar, the first frame having a first frame space defined between at least two portions of the first frame, the first frame comprising at least one cushion extending into and selectively positionable within the first frame space, the at least one first frame cushion hingedly coupled to the first frame;

receiving a first portion of the at least one rotor blade within the first frame space;

coupling a separate second frame to the first railcar, the second frame having a second frame space defined between at least two portions of the second frame, the second frame comprising at least one second frame cushion extending into and selectively positionable within the second frame space, the at least one second frame cushion hingedly coupled to the second frame; and receiving a second portion of the at least one rotor blade within the second frame space, wherein coupling a first frame to the first railcar comprises substantially centering the first frame over the at least one wheel pair of the first wheel assembly, and wherein coupling a second frame to the first railcar comprises spacing the second frame away from the first frame to facilitate at least one of partially containing and partially supporting the at least one rotor blade, and substantially centering the second frame over the at least one wheel pair of the second wheel assembly.

16. A method in accordance with claim 15 wherein providing a plurality of railcars comprises coupling a second railcar to a first longitudinal end of the first railcar, and at least partially overlapping the second railcar with an overhanging portion of the at least one rotor blade.

17. A method in accordance with claim 16 wherein providing a plurality of railcars comprises coupling a third railcar coupled to a second longitudinal end of the first railcar, and at least partially overlapping the third railcar with another overhanging portion of the at least one rotor blade.

18. A method in accordance with claim 17 wherein at least one of coupling a second railcar and coupling a third railcar comprises coupling an unloaded idler car.

19. A method in accordance with claim 15 wherein providing a first railcar comprises providing an articulated car.

20. A method in accordance with claim 15 wherein the at least one rotor blade comprises a plurality of rotor blades.

* * * * *